United States Patent
Breslin et al.

(10) Patent No.: US 7,267,882 B2
(45) Date of Patent: Sep. 11, 2007

(54) CERAMIC/METAL MATERIAL AND METHOD FOR MAKING SAME

(75) Inventors: Michael C. Breslin, Worthington, OH (US); Andrew C. Strange, Worthington, OH (US); Michael E. Fuller, Gahanna, OH (US)

(73) Assignee: RMG Technologies, Inc., Fowlerville, MI (US)

( * ) Notice: Subject to any disclaimer, the term of this patent is extended or adjusted under 35 U.S.C. 154(b) by 318 days.

(21) Appl. No.: 10/625,267

(22) Filed: Jul. 23, 2003

(65) Prior Publication Data

US 2004/0237713 A1    Dec. 2, 2004

Related U.S. Application Data

(60) Provisional application No. 60/398,063, filed on Jul. 24, 2002.

(51) Int. Cl.
  B32B 15/20     (2006.01)
  B32B 15/16     (2006.01)
  C04B 35/56     (2006.01)
  C04B 35/563    (2006.01)
  C04B 35/565    (2006.01)

(52) U.S. Cl. .................. 428/450; 428/446; 428/469; 501/89; 501/92; 501/93; 501/96.3

(58) Field of Classification Search .................. None
    See application file for complete search history.

(56) References Cited

U.S. PATENT DOCUMENTS

| | | | |
|---|---|---|---|
| 2,702,750 A | | 2/1955 | George |
| 4,610,726 A | | 9/1986 | King |
| 4,670,320 A | * | 6/1987 | Yamaguchi et al. ........ 428/141 |
| 4,673,435 A | * | 6/1987 | Yamaguchi et al. .......... 75/235 |
| 4,713,360 A | | 12/1987 | Newkirk et al. |
| 4,851,375 A | | 7/1989 | Newkirk et al. |
| 4,921,818 A | * | 5/1990 | Lesher et al. ................ 501/89 |
| 4,940,679 A | | 7/1990 | Claar et al. |
| 5,164,233 A | * | 11/1992 | Sonuparlak et al. ........ 427/399 |
| 5,214,011 A | * | 5/1993 | Breslin ....................... 501/127 |
| 5,333,670 A | | 8/1994 | Brandy et al. |
| 5,458,480 A | | 10/1995 | Newkirk et al. |
| 5,526,914 A | | 6/1996 | Dwivedi et al. |

(Continued)

OTHER PUBLICATIONS

Dhandapani, S. P. et al., Growth and Microstructure of $Al_2O_3$—SiC—Si(Al) Composites Prepared by Reactive Infiltration of Silicon Carbide Preforms, ACTA Metallurgica Et Materialia; vol. 42, No. 3 pp. 649-656 (Mar. 1994).

(Continued)

Primary Examiner—Jennifer C. McNeil
Assistant Examiner—Jason L. Savage
(74) Attorney, Agent, or Firm—Gifford, Krass, Sprinkle, Anderson & Citkowski, P.C.

(57) ABSTRACT

An improved ceramic/metal composite material is disclosed which is fully reacted with aluminum. The composite is made from a ceramic preform, such as silicon carbide, having a binding agent, such as silica, that is contacted with a metal mixture or alloy, such as aluminum/silicon, that reacts with the binding agent to form a ceramic/metal composite material. Also disclosed is a method of making the improved composite material and articles made incorporating the material.

27 Claims, 6 Drawing Sheets

U.S. PATENT DOCUMENTS

| | | | |
|---|---|---|---|
| 5,531,260 A | | 7/1996 | Burke |
| 5,633,213 A | * | 5/1997 | Aghajanian et al. .......... 501/87 |
| 5,700,422 A | | 12/1997 | Usui et al. |
| 5,728,638 A | | 3/1998 | Strange et al. |
| 6,024,259 A | | 2/2000 | Gardner et al. |
| 6,287,447 B1 | * | 9/2001 | de Nora et al. ............. 205/378 |
| 6,296,045 B1 | * | 10/2001 | Fox et al. ..................... 164/98 |
| 6,378,755 B1 | | 4/2002 | Grylls et al. |

OTHER PUBLICATIONS

Kolman D. G., Butt, D.P., Corrosion Behavior of a Novel SiC/ $Al_2O_3$/Al Composite Exposed to Chloride Environments, *J. of ElectroChemical Soc'y* vol. 144, No. 11, pp. 3785-3791 (Nov. 19, 1997).

Mars G. Fontana, Corrosion Engineering, 407-11 (McGraw-Hill Book Co., 3d ed. 1986).

Bandini, C., et al. Processing of Co-Continuous Ceramic Composites by Reactive Penetration Method: Influence of Composition of Ceramic Preforms and Infiltrating Alloys, *Int. J. of Materials & Product Technology*, vol. 17, Nos. 3-4, pp. 182-204 (2002).

Park, Hong Sik, and Kim Do Kyung, Effect of Silica Surface Dopants on the Formation of Alumina/Aluminum Composites by the Directed Metal Oxidation of an Aluminum Alloy, *J. Am. Ceram. Soc.* 84 [11] pp. 2526-2530 (2001).

Murthy, V. S. R. et al. "Microstructure and mechanical properties of SiC—Al—$Al_2O_3$ composites prepared by directed melt infiltration" British Ceramic Transactions, 1996, Inst. Mater, UK; vol. 95, No. 4, pp. 173-176.

Jayaram V., et al., "Infiltration of Al2O3—Al composites into coated silicon carbide," Proceedings of the 1995 Conference on Inorganic Matrix Composites, Bangalore, India, Mar. 8-11, 1995, pp. 193-206.

Cui Yan et al. "Investigation on the microstructure of $SiC_p$/$Al_2O_3$-Al composites synthesized by oxidative infiltration of Al melt" Hangkong Cailiao Xuebao; Hangkong Cailao Xuebao/Journal of Aeronautical Materials Dec, 2001, vol. 21, No. 4 Dec. 2001, pp. 23-27.

International Search Report for PCT/US03/22947.

* cited by examiner

US 7,267,882 B2

CERAMIC/METAL MATERIAL AND METHOD FOR MAKING SAME

CROSS REFERENCE TO RELATED APPLICATION

This application claims the benefit under 35 U.S.C. § 119(e) of U.S. Provisional Application 60/398,063 filed Jul. 24, 2002, titled IMPROVED CERAMIC/METAL MATERIAL AND METHOD FOR MAKING SAME, which application is hereby incorporated by reference in its entirety.

BACKGROUND

The present invention generally relates to ceramic/metal materials and, more specifically, to carbide- and boride-based materials and methods for making these materials.

Composite materials that have a metal matrix and a strengthening or reinforcing phase such as ceramic particulates, whiskers, fibers, or the like, are used for a variety of applications because they combine some of the stiffness and wear resistance of the reinforcing phase with the ductility and toughness of the metal matrix. These materials are generally referred to as metal matrix composites (MMCs). Such a composite generally shows improved strength, wear resistance, and high temperature compatibility relative to using the metal only and may also weigh less than the same article made from metal alone.

Likewise, composites in which the bonding or matrix phase is made from a ceramic material and the reinforcing phase is a metal or other ceramic are also used for manufacture of articles. These materials are generally referred to as ceramic matrix composites (CMCs). These materials also reflect improved strength, stiffness, wear resistance, and temperature compatibility compared to using the metal alone and also show improved ductility and toughness when compared to the ceramic component alone. While ceramic materials alone provide improved temperature resistance and strength over metals alone, a primary disadvantage in the use of ceramic materials alone is lack of reliability. This low reliability stems from low fracture toughness and brittle fracture behavior, which renders ceramics sensitive to rapid catastrophic failure in response to accidental overloading, contact damage, or rapid temperature changes. Addition of a metal reinforcing phase provides improved reliability over ceramics alone.

Because of the improved material properties realized by combining the metal and ceramic into a composite material, these materials have found use in a variety of applications, including applications in the aerospace, automotive, medical, and sports industries. One way in which to create such a composite material is vapor-phase oxidation of a bulk molten metal, usually in an inert graphite or alumina crucible, by a gas to produce a solid ceramic-containing body via a directed growth process, such as described in U.S. Pat. No. 4,713,360. A reaction product will form initially on the exposed surface of a pool of the molten metal and then grow outward, fed by transport of additional metal through channels in the ceramic product of the oxidation reaction between the parent metal and the gas phase oxidant to further react with the gas.

A direct metal oxide process to create a composite is a unidirectional process and growth will occur from one side of the material to the other. Thus, the material may not be homogenous from one side to the other. It is also known that infiltration of porous ceramic materials (e.g., $Al_2O_3$, $B_4C$, SiC) with molten metal can result in a ceramic/metal composite.

Another method of forming a ceramic/metal composite is by non-vapor phase oxidation of the molten metal by a sacrificial ceramic preform, such as described in U.S. Pat. No. 5,214,011, which includes placement of the sacrificial preform in contact with a molten metal at a temperature greater than the melting point of the metal but less than the melting point or softening point of the sacrificial preform. The sacrificial preform and the molten metal are maintained in contact at the elevated temperature for a time sufficient to allow the sacrificial preform to at least partially transform into a ceramic metal oxide body containing a metallic phase.

Some composite materials also include whiskers, particles, or other additions, such as ceramic carbide particles, to improve specific properties. Most structural materials that contain carbide ceramic particles use small carbide particles because small particles sinter better and result in improved properties. In MMC materials, small particles are used because larger particles would reduce the strength and fracture toughness. In MMC materials, these small particles are easy to dislodge, because they are held by a soft/ductile metal matrix. Further, because their diameter is small, only a small area of interfacial bonding is holding them in place.

SUMMARY OF THE INVENTION

The present invention provides an improved boride- or carbide-based ceramic/metal composite material in which the initial boride- or carbide-based ceramic portion is silica-bonded and chemically stabilized in a molten metal bath such that the boride or carbide is not significantly consumed, transformed, dissolved, reacted, or affected by the molten metal bath. The materials of the present invention provide improved properties over conventional composites. Articles made from the composite material of the present invention may be used to handle molten metal substantially without reaction with the molten metal.

The present invention includes a method for forming a boride- or carbide-based ceramic/metal composite material in which silica is combined with a boride or carbide to obtain a silica-bonded preform having at least about 50 volume percent boride or carbide, which is then contacted with a molten metal having at least about 18 weight percent, and no more than about 95 weight percent, silicon, the remainder being substantially aluminum and impurities. The reaction between the aluminum and the silica in the preform is allowed to go substantially to completion to form a composite having at least about 50 volume percent carbide or boride, the remainder being substantially alumina, aluminum alloy, and impurities. The substantially reacted composite is then removed from contact with molten metal for further processing and use.

DETAILED DESCRIPTION OF THE INVENTION

Figure 1:
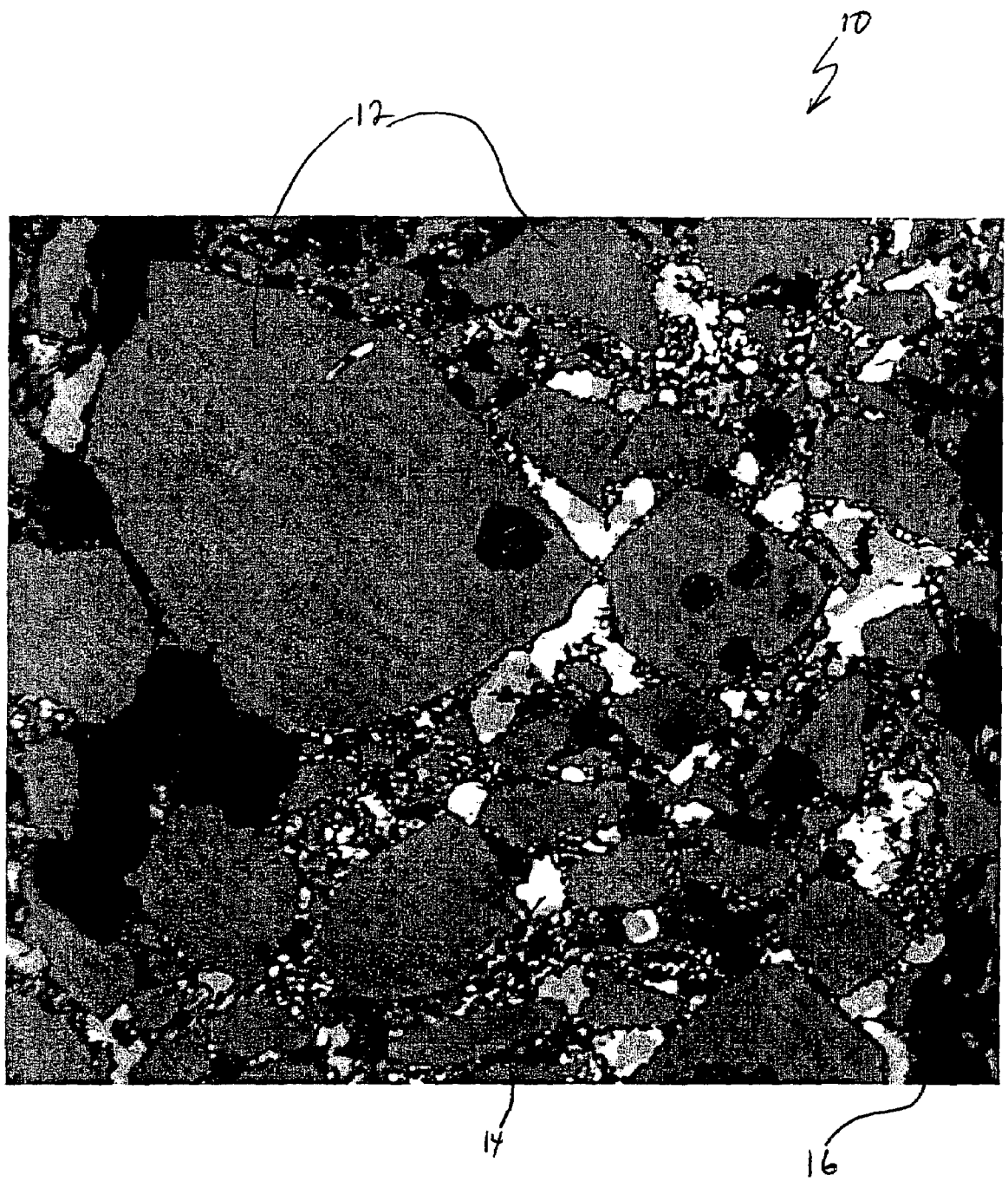
FIG. 1 is a Scanning Electron Microscope microphotograph of the ceramic/metal composite of the present invention.

The present invention is directed to a ceramic/metal composite material in which the bonding or matrix phase is a ceramic/metal composite. A preferred embodiment is a composite material including silicon carbide (SiC), alumina ($Al_2O_3$), and aluminum (Al). Without intending to be limited to the particular materials disclosed, the invention will be described in an exemplary manner as it relates to the silicon carbide, alumina, and aluminum composite material and a method of making this material.

Use of the term "metal" herein includes pure metal or metals, metal alloys, inter-metallic compounds, and mixtures thereof. Use of the term "ceramic" herein is defined as inorganic, nonmetallic materials, typically crystalline in nature, and generally are compounds formed between metallic and nonmetallic elements, such as aluminum and oxygen (alumina-$Al_2O_3$), calcium and oxygen (calcia-CaO), silicon and oxygen (silica-$SiO_2$), and other analogous oxides, nitrides, borides, sulfides, and carbides. Use of the term "or" herein is the inclusive, and not the exclusive, use. See BRYAN A. GARNER, A DICTIONARY OF MODERN LEGAL USAGE 624 (2d Ed. 1995). Use of the term "silica-bonded" herein means that the silica is bonded to the surface of boride, carbide, or other ceramic particles and to other silica molecules, providing essentially a coating around boride, carbide, or other ceramic particles and allowing boride, carbide, or other ceramic particles to be agglomerated into a dense body.

In a preferred embodiment, silica is combined with silicon carbide in a conventional manner to obtain a silica-bonded silicon carbide preform having at least about 50 volume percent silicon carbide. The preform may be formed into substantially a desired shape of a final article by any conventional manner, such as slip casting, extrusion, or the like. The preform is preheated to an operating temperature, generally between about 1000° C. and about 1250° C. Then the shaped, heated preform is removed from the preheat furnace and placed into a reaction furnace, in which it is placed in contact with, and preferably completely immersed in, a molten metal having between about 18 weight percent and about 95 weight percent silicon, with the remainder being substantially aluminum and any impurities. This contact may be accomplished in a variety of manners, including floating the preform on a molten metal bath, pouring the molten metal into or over the preform, forcing the molten metal into the preform, or any other manner in which the preform and the molten metal are brought into contact. The molten metal, intentionally or unintentionally, may have other components than aluminum and silicon, such as, for example, other metals, dopants, alloying agents, or contaminants, depending on the circumstances.

The preform is allowed to remain submerged or otherwise contacted with the molten metal until the reaction between the aluminum and the silica has progressed to a desired degree, generally to completion (see below). Once the desired degree of reaction completion has been obtained, the preform, which is now composite material, is removed from the bath and any molten metal adhering to the non-molten surface of the composite material is removed and the composite material is allowed to cool. The final article is now ready for use, further finishing, etc.

The molten aluminum/silicon bath is kept at a temperature greater than the melting point of the aluminum, but less than the melting point or softening point of the preform. Preferably, this temperature is between about 1000 and about 1250° C., well above the melting point of the aluminum alloy at atmospheric pressure. The silicon percentage in the molten aluminum alloy is preferably between about 20 and about 30 weight percent silicon, and most preferably is about 25 weight percent silicon. The process has been successfully completed at pressures between 5 psi above atmospheric pressure and about 5 micrometers Hg, absolute. The process has also been successfully completed in inert atmospheres. It is believed that the process may also be successfully completed at higher pressures, and, as discussed below, the process and reaction are not dependent on forcing the molten metal into pores in the preform. Because the preform is preferably submerged into the molten metal, there is no atmosphere surrounding the reaction other than the molten metal. It is not necessary to submerge the preform, but by doing so, the reaction will proceed from all exterior surfaces of the preform toward the center of the preform and will result in less time required for the entire preform to undergo reaction. There may be circumstances in which it is desired not to submerge the preform, but to provide contact between the preform and the molten metal in another fashion, in which case the composition of the atmosphere may be controlled, or not, depending on the preferences of the user.

The silica in the preform reacts at the elevated temperature of the molten aluminum alloy to the extent necessary for the preform to serve as an oxidizer for the oxidation of the liquid aluminum in the molten metal bath to aluminum oxide. The aluminum reduces the silica, forming silicon and oxygen, and reacts with the oxygen to form alumina. The silicon from the reacted silica becomes alloyed with the molten metal, and some silica may be retained in the final composite material. In a manner of speaking, the aluminum displaces and replaces the silicon in the silica and forms alumina. In this embodiment, the following reaction is taking place:

$$3SiO_2 + 4Al \rightarrow 2Al_2O_3 + 3Si \qquad (1)$$

The preform and the molten metal are maintained in contact at this elevated temperature for a time sufficient to allow the silica in the preform to substantially fully react with the molten aluminum to yield the composite material. By substantially fully react, it is meant that the reaction set forth in Reaction (1), above, consumes silica such that the silica remaining in the preform is less than about five weight percent, and, preferably, less than about one weight percent. It is within the scope of the invention, however, to allow the reaction to progress to a predetermined point having more or less silica, at which time the article is removed from contact with the molten metal.

The reaction will generally result in about 35 volume % metal (aluminum) and about 65 volume % ceramic (alumina) for the portion replacing the silica (which excludes the non-reactive portion, the silicon carbide in this embodiment). So, if there is 50 volume % silicon carbide and 50 volume % silica in the preform, the reacted composite will have about 50 volume % silicon carbide, about 32 volume % aluminum oxide and about 18 volume % aluminum. If the preform is about 90 volume % silicon carbide and about 10 volume % silica, the reacted composite will have about 90 volume % silicon carbide, about 7 volume % alumina, and about 3 volume % aluminum. Similarly, other volume percentages between 50 percent and 90 percent of silicon carbide in the preform and reacted composite will result in comparable volume percentages of alumina and aluminum in the reacted composite.

With sufficient silicon present in the molten metal, the reaction of the silica with the molten aluminum to form alumina is thermodynamically favorable, while the reaction of the aluminum with the silicon carbide is suppressed (see below). By allowing this reaction to go substantially to completion, there is most preferably no silica remaining in the composite material after the reaction is complete. There may, however, be some small amount of silica that remains in the composite material. Moreover, surface silicon carbide in the composite material may oxidize to form silica, which may result in a coating of silica on that portion of the surface of the final composite material article exposed to an oxygen-containing atmosphere. Once the reaction is complete, the fully reacted composite material is then removed from contact with the molten metal.

As Reaction (1) progresses, some aluminum alloy becomes part of the matrix of the composite material itself. The silica is replaced by both the alumina and the aluminum. The silicon carbide in, the original preform does not react with the aluminum, and the amount of silicon carbide in the original preform is substantially similar to the amount of silicon carbide in the composite after the reaction has gone substantially to completion. Thus, the silicon carbide does not provide a sacrificial preform to be reacted in the molten aluminum alloy, but provides a phase that will be unreacted from the time the preform is contacted with the molten metal until the contact is discontinued. The resulting composite material made in accordance with the present invention has a ceramic/metal composite that forms the bonding or matrix phase of the material and is surprisingly different from conventional composites or ceramics in which the bonding phase is a single component such as aluminum or silicon (metal matrix composites) or silicon nitride or aluminum oxide (ceramic matrix composites).

The reaction rate between the aluminum and the silica determines the length of time that the molten aluminum is to remain in contact with the preform before the reaction is substanitally complete. At 1150° C., the reaction rates are such that about 1 to about 3 mm/hour depth of preform will react. In other words, the contact must be maintained at 1150° C. for about 20 to about 60 minutes for each millimeter of penetration into the preform. The more dense the preform, the faster the reaction will proceed because there are fewer voids and interstitial cavities providing no silica reactant. Preferably, densities greater than about 75 volume percent, and, most preferably, greater than about 85 volume percent are used, but the more dense the preform is, the faster and more uniform the reaction will progress.

Conventional composite preparation techniques generally favor increased porosity to enable the metal to flow into the preform and maximize contact with the ceramic matrix, and, thus, need continuous porosity through the preform, so there is a flowpath without restrictive pressure, or pockets may form that the liquid metal cannot penetrate. These processes often use positive or negative pressure to force the metal to flow into and through the pores. Unlike conventional composite formation, the aluminum in the present invention need not travel through pores in the ceramic to contact the reactants and porosity of the preform is disfavored in the present invention, because the formation of the composite is reaction-driven and not driven by filling of pores.

Surprisingly, the reaction does not significantly affect the size and shape of the preform. In other words, the product article that results after completion of the described reaction is of substantially the same size and shape as the original preform.

Molten aluminum is a highly reactive metal, and typically reacts with silicon carbide to form aluminum carbide in accordance with the following reaction:

$$3SiC+4Al \rightarrow Al_4C_3+3Si \qquad (2)$$

Aluminum carbide is detrimental for the composite material because this carbide easily undergoes decomposition to methane and alumina by reaction with air moisture. Because the silicon carbide is an integral portion of the ceramic phase of the composite material, its reaction to form aluminum carbide and subsequent decomposition to methane may result in problems with the integrity of the structure of the composite material or the article made therefrom.

While conventional composite materials may include silicon carbide particulates, whiskers, or fibers to enhance properties of the material, it is surprising that the composite material of the present invention includes silicon carbide as a substantial component without significant reaction with the aluminum, which is attained because of the addition of silicon to the molten aluminum used to fabricate the composite material. The reaction of aluminum with the silicon carbide is no longer thermodynamically favorable with at least about 18 weight percent silicon in the molten metal. Without intending to be bound to any particular theory, it is believed that the silicon carbide may be prevented from reacting with the aluminum to form aluminum carbide by pushing the above reaction (2) to the left due to the abundance of silicon. This may be accomplished by insuring that there is a sufficient amount of silicon in the molten metal bath, which minimizes or eliminates aluminum carbide formation. Too much silicon, however, may preclude the reaction of aluminum with silica, if there is insufficient aluminum in the molten metal.

By providing silica-bonded silicon carbide and molten metal with at least about 18 weight percent silicon, stabilization of the silicon carbide in molten aluminum is achieved. Unexpectedly, this allows for creation of a silicon carbide-based composite material in which the bonding or matrix phase is a ceramic/metal composite. The silica reacts with the aluminum to form alumina and the silicon in the molten aluminum alloy prevents the aluminum from reacting with the silicon carbide to form detrimental aluminum carbide.

While the invention has been described in terms of using silica-bonded silicon carbide to react in a molten aluminum-silicon metal bath, silica-bonded boron carbide ($B_4C$) may also be used in a molten aluminum-silicon bath having at least about 18 weight percent silicon to result in a boron carbide-based composite material that has silica bonded phase that has fully reacted with the molten metal bath. Boron carbide-based preforms and composite materials having up to about 75 volume percent boron carbide, remainder substantially silica, have been formed in accordance with the present invention.

Titanium diboride is another ceramic that may be used in the preform in a similar manner.

A mixture of silicon carbide and boron carbide will also result in an advantageous carbide composition. An initial preform of 50 volume percent silicon carbide, 15 volume percent boron carbide, and 35 volume percent silica submerged in the molten aluminum alloy with at least about 18 weight percent silicon resulted in a carbide-based composite material with greater strength than the use of silicon carbide without boron carbide. The addition of the boron carbide to the preform generally allows for a more dense and less porous preform, providing improved reaction, as discussed above. Compositions including mixtures of silicon carbide and about 0 volume percent to about 45 volume percent boron carbide have also been formed in accordance with the present invention. Moreover, whiskers, fibers, or other particulates may also be added to the preform material to provide desired properties for particular circumstances, as is known.

The use of significant amounts of boron carbide in the preform is surprising because oxidation of boron carbide results in boron oxide ($B_2O_3$). Boron oxide will hydrolize at room temperature, and, if immersed in water, will dissolve. If the grain boundaries of a boron carbide material contained any appreciable amount of boron oxide, the grain boundary would dissolve in water and the article would lose geometric integrity. Thus, conventional processes for boron carbide materials attempt to exclude boron oxide from forming. The oxidation of boron carbide to boron oxide in the present invention is not disfavored, however, because the presence of boron oxide in combination with the silica allows particle rearrangement during sintering and provides high densities in a reasonable time frame. As discussed above, high densities are preferred in the present invention. Boron oxide also behaves as an oxidant and becomes part of the silica-bonding phase by reacting along with the silica to aid in the formation of the aluminum/alumina phase.

It is believed that other ceramics, including mixtures of other carbides, or mixtures of carbides/borides or of borides, may also be added to the bonding or matrix phase of the composite material and that ceramics of the formula $A_wB_x$ and having a bonding agent may thus be stabilized in any molten metal M in which the following reaction occurs:

$$A_wB_x + M \rightarrow M_yB_z + N \quad (3)$$

in which $A_wB_x$ is a ceramic (B not necessarily being boron); M is a metal selected from the group consisting of Al, Fe, Ni, Co, Mg, Ti, Ta, W, Y, and Nb that is reactive with the bonding agent; $M_yB_z$ is an undesired reaction product; and N, which may or may not be A and is not nitrogen, is a metal included in the molten metal bath. By including a sufficient amount of the metal N in a molten metal bath with metal M to drive the reaction to the left, the ceramic $A_wB_x$ may be stabilized. It is not entirely necessary to ensure that the reaction (3) is driven to the left. It can be sufficient, especially with carbides, to make the undesired reaction product unstable in the molten metal alloy environment, resulting in the decomposition of the undesired reaction product.

For example, TiC could be stabilized in a molten aluminum bath, preventing formation of aluminum carbide, by including sufficient amount of titanium alloyed with the aluminum in the bath. The amount of titanium necessary to stabilize the titanium carbide at a particular temperature may be determined by one of ordinary skill in the art without undue experimentation. Boron oxide could be used as a bonding agent in place of silica if the metal is boron.

Preferably, the carbide particles make up at least about 50 volume percent of the initial preform and at least about 50 volume percent of the resulting composite material after reaction with the molten metal. Unlike conventional composite materials with silicon carbide particulates dispersed therein that must use extremely small silicon carbon particulates, the silicon carbide particulates of the present invention are generally between about 5 and about 5000 micrometers in average diameter and, preferably, are touching or substantially touching throughout the composite material. While individual SiC particulates are generally not perfectly round, the average diameter of individual particulates is preferred to be in this range. Particulates with diameters of less than 5 and more than 5000 micrometers are also acceptable, and are often present in batches of SiC particulates, but preferably the majority of particulates have average diameters between about 5 and about 5000 micrometers.

Use of the term "touching" does not only mean bonded, but that the particulates are physically touching or bonded. Moreover, it is not necessary that all particulates are touching, just that a substantial portion of the particulates are touching. It is surprising that the present invention allows the use of such large silicon carbide particulates, which provide greater improvement to strength, thermal and electrical conductivity, thermal shock resistance, hardness, and wear resistance than what is typically seen in conventional composites using particulates, whiskers, fibers, or other loading of silicon carbide.

An unexpected result of the use of such large silicon carbide particulates is the reduced loss of particles from the composite material as a result of abrasion or wear. Conventional ceramic materials having carbide particulates use small particles, because small particles sinter better and result in improved strength to the material. Conventional MMC materials incorporating carbide particulates use smaller particles, because these smaller particles do not reduce the strength and fracture toughness as much as would larger particles. The larger particles of the present invention are embedded in a harder matrix than the small particles of conventional MMC materials, which are embedded in a soft/ductile matrix (metal), so are less likely to dislodge. Moreover, particles can only be embedded up to the depth of their diameter, and the larger diameter particles of the present invention are, thus, embedded more soundly than the smaller particles of conventional materials.

The hard/tough matrix of the present invention holds the particles in place and makes them more difficult to dislodge than with conventional MMC materials. The matrix of the present invention also is resistant to erosion because of the hardness of the matrix. These features of the present invention make it difficult to dislodge carbide particles. These features, including the hardness, strength, and toughness of the composite material of the present invention, make this material particularly suitable for articles in which one or more surfaces are to be exposed to friction or wear, such as bearings, nozzles, bushings, valve components, liners, etc. Many articles in the automotive and aerospace industries are advantageously fabricated in accordance with the present invention, including brake rotors, clutches, engine components, and turbine components.

Because few particles are dislodged from the material of the present invention under friction or abrasion conditions, third body wear is minimized. Third body wear is the wear or abrasion that occurs when embedded particles in the surface of a first material are dislodged from the surface and migrate into a space between the first material and a second material in contact with the first material. These dislodged particles then provide a grinding action between the two materials, which results in wear of one or both materials.

While not all of the silicon carbide particulates are touching other silicon carbide particulates, the presence of silicon carbide in at least 50 volume percent preferably results in sufficient amount of touching to provide an essentially continuous silicon carbide phase throughout the preform and the reacted composite material. This enables a path for thermal or electrical communication through the silicon carbide phase. Preferably, there is at least about 60 volume percent of silicon carbide in the preform, which promotes such touching and the essentially continuous silicon carbide phase. The silicon carbide particulates generally remain discrete from other silicon carbide particulates, but the touching of particulates results in an essentially continuous silicon carbide phase.

The metal phase of the present invention, preferably aluminum or aluminum alloy, as discussed above, is preferably also essentially continuous.

FIG. 1 illustrates a portion of a ceramic/metal composite 10 of the present invention, wherein silicon carbide particulates 12 (grey) are shown with alumina 14 (white) and aluminum metal 16 (black). The silicon carbide particulates 12 are substantially touching and are preferably present as greater than 50 volume percent of the ceramic/metal composites 10.

The material of the present invention is particularly suitable for use with articles that are required to contact molten aluminum. Molten aluminum is a highly reactive metal that tends to react with metals, ceramics, or ceramic/metal composites, or other materials with which it comes in contact. As is known in the art, there are few, if any, metals or alloys that are totally immune to attack from liquid aluminum, and almost every metal is severely attacked. The aluminum tends to react with, decompose, or otherwise alter the structure or composition of the contacted material. In some cases this occurs rather quickly; in other cases, this occurs over time. In any event, this can result in the molten aluminum becoming contaminated with reaction products from the contacted material or by the contacted material itself, and can result in degradation of the structural integrity of the contacted material.

In contrast, the composite material of the present invention has already been fully reacted with aluminum at a temperature substantially above the melting point of the aluminum when the aluminum reacts with the silica in the preform to form alumina. There is no further reaction with aluminum. At the operating temperatures of the present invention, this reaction occurs to form the α phase of alumina, instead of one of the transition phases, such as θ-alumina (or β-alumina, γ-alumina, and δ-alumina). θ-alumina is a crystal structure of aluminum oxide that occurs upon the reaction of aluminum with silica at temperatures below 1800° F. (~980° C.). These lower temperatures are typical for foundry operating temperatures, resulting in formation of θ-alumina. Degradation of aluminum handling ceramic or composite materials containing fused silica or other ceramic is more likely to occur when θ-alumina is formed than when α-alumina is formed, because the θ-alumina is a weak structural material. When the alumina is formed at temperatures below about 1800° F. (~980° C.), the presence of the θ-alumina may result in catastrophic structural damage to the material. The present invention results in the formation of primarily α-alumina, which is the thermodynamically stable crystal structure at all temperature ranges and is stable with respect to time, temperature, and aluminum contact.

The composite material of the present invention, which, in a preferred embodiment, is primarily a silicon carbide/aluminum/alumina composite, may thus contact molten aluminum without deleterious effects. This is unexpected, because most silicon carbide bodies contain a bonding phase that would react with, or dissolve in, molten aluminum, which may reduce the structural integrity of the component. The traditional bonding phases are clay, silica, carbon and/or silicon metal. It also is expected that the aluminum metal in the present composite would melt and leave the composite when subjected to temperatures greater than that of the melting point of aluminum. The material of the present invention, however, does not demonstrate substantial migration of the aluminum metal from the composite, even at such temperatures greater than the melting point of the aluminum.

Figure 2:
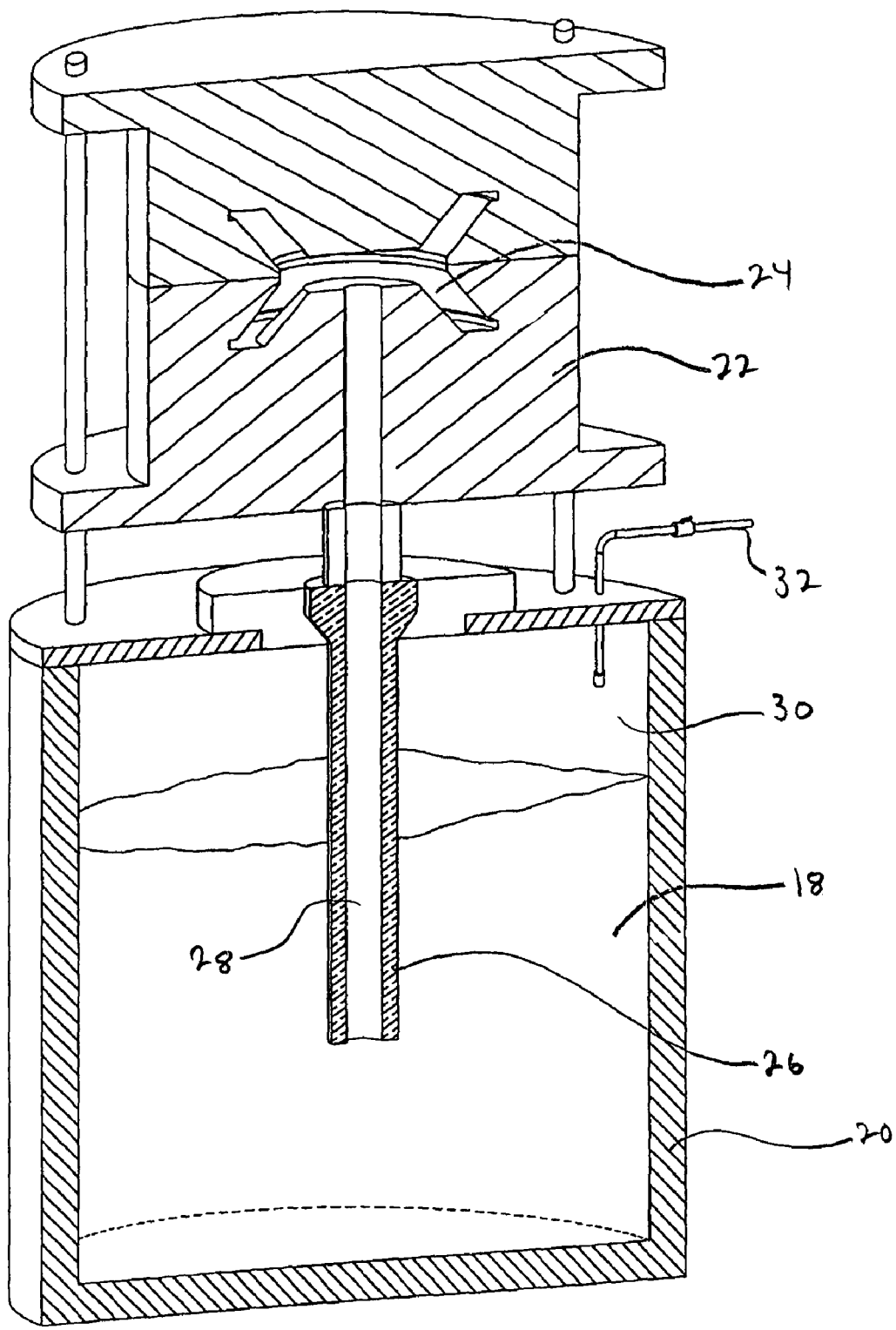
FIG. 2 is an elevational view of a low pressure mold illustrating a riser tube and a die/mold made in accordance with the present invention.

For example, in metal casting industries, including aluminum casting, low pressure die casting is frequently performed, including a technique known as Low Pressure Permanent Mold (LPPM) processing. FIG. 2 illustrates such an LPPM process, in which a molten metal 18 is contained within a crucible or vat 20. A die or mold 22 having a mold cavity 24 sits atop the vat 20 and is fastened to the top of a riser tube 26 which extends downward into the bath of molten metal 18. The riser tube 26 is also referred to as a "stalk," and includes a bore 28 therethrough. When a positive pressure is applied to a gas area 30 above the molten metal 18 in the vat 20 via a pressure pipe 32, molten metal 18 is forced upwardly through the bore 28 into the mold cavity 24. The stalk or riser tube 26 must be nearly gas tight to prohibit gas from the gas area 30 from becoming entrained in the molten metal rising up the bore 28, which could result in gas voids in the finished metal casting, and to maintain a positive pressure differential between the outside of the riser tube 26 and the bore 28, causing the molten metal 18 to be moved into the mold cavity 24. Traditional riser tubes 26 are formed by casting metal blanks, typically of cast iron, into the desired geometry, or forming ceramic tubes (e.g., silicon nitride, SiAlON, aluminum titanate, fused silica) using conventional processing techniques. Iron or steel riser tubes tend to contaminate molten metals such as aluminum via dissolution, and may yield lower quality metal castings. Fused silica ceramic riser tubes are frequently used, but lack mechanical strength to survive typical handling practices in a casting facility. In the case of molten aluminum, silica is reactive with this metal, and, hence, the molten metal may pick up contamination and the life of the tube 26 will be shortened.

If the riser tube 26 reacts with the molten aluminum 18, then not only may the structural integrity of the riser tube 26 suffer and it becomes more susceptible to physical shock, but impurities may be introduced into the part generated by the mold cavity 24 via entrained gas from the gas area 30, the composition of the riser tube 26, or reaction products from reaction of the riser tube 26 with the molten metal 18. Such reaction may also modify the crystalline structure of the riser tube 26 or result in other changes to the riser tube 26 such that when the riser tube 26 is removed from the bath of molten metal 18, such as for maintenance relating to the riser tube 26 or to the vat 20, etc., the riser tube 26 may be exposed to thermal or mechanical shock and experience brittle fracture or other failure because of the changes from the reaction with the molten metal 18. These systems are typically in use a high proportion of available time, and require regular maintenance, so the occasion for thermal and mechanical shock arises frequently.

Riser tubes 26 made in accordance with the present invention have already been fully reacted with aluminum, and so do not further react, decompose, degrade, etc., during contact with the molten aluminum. Thus, impurities are not introduced into the part made by mold cavity 24 or into the molten metal 18, and the structural integrity of the riser tube 26 remains sound, even when it is exposed to thermal or mechanical shock. Riser tubes 26 made in accordance with the present invention do not undergo the same magnitude of thermal shock when removed from contact with the molten metal, because the composite material does not undergo the reactions and other changes that conventional materials undergo. This is also true for other articles made in accordance with the present invention, as discussed herein.

Moreover, because of the high density and low porosity of the composite material from which the riser tube 26 is made, gas is substantially prohibited from becoming entrained in the molten metal as it rises up the bore 28 which may otherwise siphon gas from the gas area 30 into the bore 28 through the walls of the riser tube 26. And there is no or very little gas penetration through the walls of the riser tube 26 such that a positive pressure differential is maintained between the bore 28 and the exterior of the riser tube 26 to efficiently force the molten metal 18 through the bore 28 into the mold cavity 24.

Figure 3:
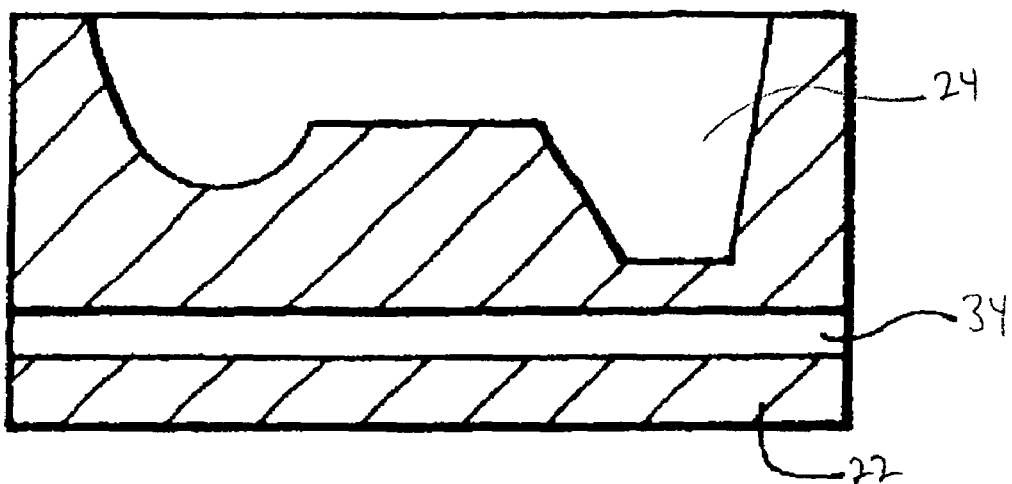
FIG. 3 is a side elevational view of a die/mold made in accordance with the present invention, having cooling channels therethrough.
Figure 4:
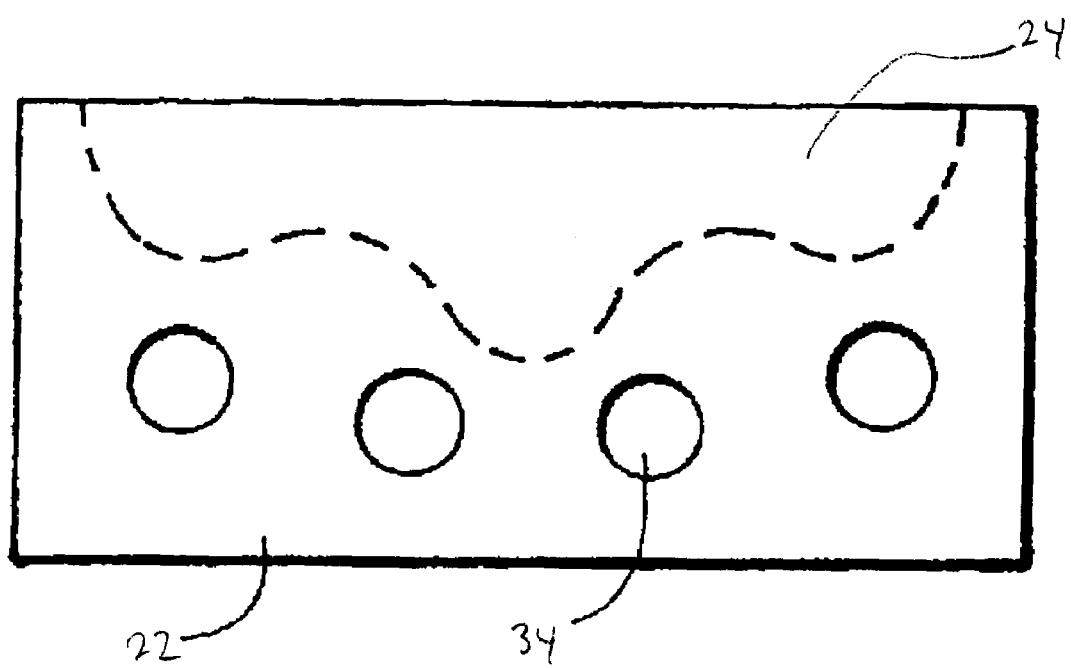
FIG. 4 is an end elevational view of the die/mold of FIG. 3.

The composite material of the present invention is also suitable for use as the material from which the mold 22 is made. If, for example, the molten metal 18 is molten aluminum, a mold 22 made from conventional materials will likely undergo the same reactions with the molten aluminum as described above, resulting in structural degradation, impurities introduced into the part made by the mold cavity 24, etc. The die/mold 22 conventionally is made from steel with a non-wetting ceramic coating applied to the surfaces of the mold cavity 24 prior to introduction of the molten metal 18. This is true regardless of whether the die/mold 22 is part of a LPPM process illustrated in FIG. 2 or any other casting process, such as represented in FIGS. 3 and 4. This ceramic coating often has to be reapplied to the surfaces of the mold cavity 24 upon every use. Generally, such coating is boron nitride (BN) or other non-wetting agent for the molten metal 18, such as another ceramic.

It is surprising to use the composite material of the present invention as die/mold material for molten aluminum because of the presence of aluminum in the composite material itself. When the molten aluminum is introduced into the mold cavity 24, it is at a temperature higher than the melting point of the aluminum contained within the structure of the composite material. While it would be expected that the structural integrity of the die/mold 22 would be compromised by the presence of molten aluminum within the structure of the die/mold 22 itself, and that leakage of this aluminum would occur because the temperature is above that of the melting point of aluminum, this is surprisingly not the case. The aluminum within the composite material does not leak out of the composite material and the structural integrity does not suffer because of the presence of aluminum. Without intending to be bound by a particular theory, the aluminum in the composite material may be trapped in the ceramic/metal matrix and unable to navigate the tortuous path necessary to emerge from the composite into the molten metal 18. Unexpectedly, this may eliminate the need to coat the surfaces of mold cavity 24, provides increased life of the mold 22, and realizes advantages discussed above, including the reduced likelihood of contamination introduced into the molten metal 18 in the mold cavity 24. The mold 22 made in accordance with the present invention does not undergo the reaction with the molten metal, as is experienced by conventional steel molds, so has an increased life and results in reduced introduction of impurities into the molded workpiece.

One method by which a mold 22 may be formed is by first making a sacrificial (e.g., wax, plastic, etc.) model of the desired workpiece to be molded. Then the preform material of the present invention is cast over the wax model, or the wax model is dipped into the preform material, or the preform material is made to coat the wax model in some other manner. The preform material is allowed to harden and the preform is dissolved or otherwise removed (e.g., melted), leaving a preform having a cavity in the shape of the desired workpiece. The preform is then submerged in or otherwise contacted with a molten metal having aluminum and silicon and allowed to react, as described above, and a final composite material mold 22 is created. Such dies/molds 22 made in accordance with the present invention are suitable for uses other than only with molten metal, such as for forming plastic/polymer articles.

In addition to these advantages, the composite material of the present invention also has improved wear resistance and improved thermal conductivity, which is advantageous with respect to the die/mold 22. Often, the die/mold 22 will have one or more cooling channels 34, through which a fluid, generally water, is circulated to cool the molten metal 18 in the mold cavity 24, as illustrated in FIGS. 3 and 4. Once the molten metal 18 has cooled, the cooled part may be removed from the die/mold 22 and more molten metal 18 injected into the mold cavity 24. The more quickly that the molten metal 18 is cooled, the more quickly the finished article may be removed from the mold cavity 24 and the mold cavity 24 again filled with molten metal 18. In other words, the more quickly the part can be cooled, the greater the throughput of material and the greater the output of parts.

Without wanting to be bound by a particular theory, it is believed that the continuity of the aluminum, or other metal phase, in the composite material of the present invention allows for the improved thermal conductivity. Also, the proximity and touching of the SiC particles provides for improved thermal conductivity over conventional materials in which the SiC particles are not touching but encased in resistive ceramic (such as alumina or silica). Further, the replacement of the silica surrounding the SiC in the preform with the aluminum/alumina layer provides contact between the aluminum and SiC particles that facilitates conductivity.

Because of this improved thermal conductivity, heat may be transferred from the molten metal 18 in the mold cavity 24 to the cooling channels 34 through the composite material mold 22 more quickly, thus reducing the time to create each part and increasing the throughput of parts through the mold 22. Moreover, fewer cooling channels 34 may be needed for the same cooling effect, or the distance between the mold cavity 24 and the cooling channels 34 may be increased as a result of the improved thermal conductivity of the composite material of the present invention.

This increased distance between the cooling channels 34 and the mold cavity 24 is surprising and important because if the molten metal, such as aluminum, reacts with the surfaces of mold cavity 24 and decomposes this surface or creates a crack, it is possible that a void may be opened through to one or more cooling channels 34 through which water is flowing. If the extremely high temperature molten metal contacts the water in cooling channels 34, the water will be instantly vaporized, creating an extremely high pressure, which may cause an explosion and resultant personnel injuries and equipment damage. Therefore, it is advantageous to locate the cooling channels 34 as far as practicable from the surfaces of the mold cavity 24 while still maintaining sufficient heat transfer through the mold 22.

Alternatively, the present invention also allows for the cooling channels 34 to be placed closer to the surface of the mold cavity 24 to improve the cooling of the molten workpiece. Because there is reduced likelihood of corrosion or breach of the cavity 24 surface with a mold 22 made in accordance with the present invention, it is less likely than with conventional materials that the aluminum will contact the cooling channels 34. Thus, if desired, improved cooling may be obtained by placing the cooling channels 34 closer to the molten workpiece.

The cooling channels 34 may be integrally formed into the preform used to form the mold 22, as described above, allowing the cooling channels 34 to be part of the formed mold 22 instead of machined into the mold 22 after its creation, as is the current standard practice.

It is also surprising and advantageous in certain circumstances to make a mold 22 that has only a portion made from the composite material of the present invention. With the improved heat transfer in the composite material of the present invention, directed selective cooling of the molten metal in the mold cavity 24 may be accomplished by removing the heat more quickly in that portion of the mold 22 made from the composite material of the present invention, such as to align crystal structure or internal domains selectively in the part made by the mold cavity 24.

Some molds 22 are made with heating elements or fluid lines embedded therein to selectively heat or provide less heat to portions of the mold 22 to control the solidification and cooling of the molten metal therein. Molds 22 made in accordance with the present invention are particularly well suited to this control of the cooling/heating process because of the improved thermal conductivity.

Figure 5:
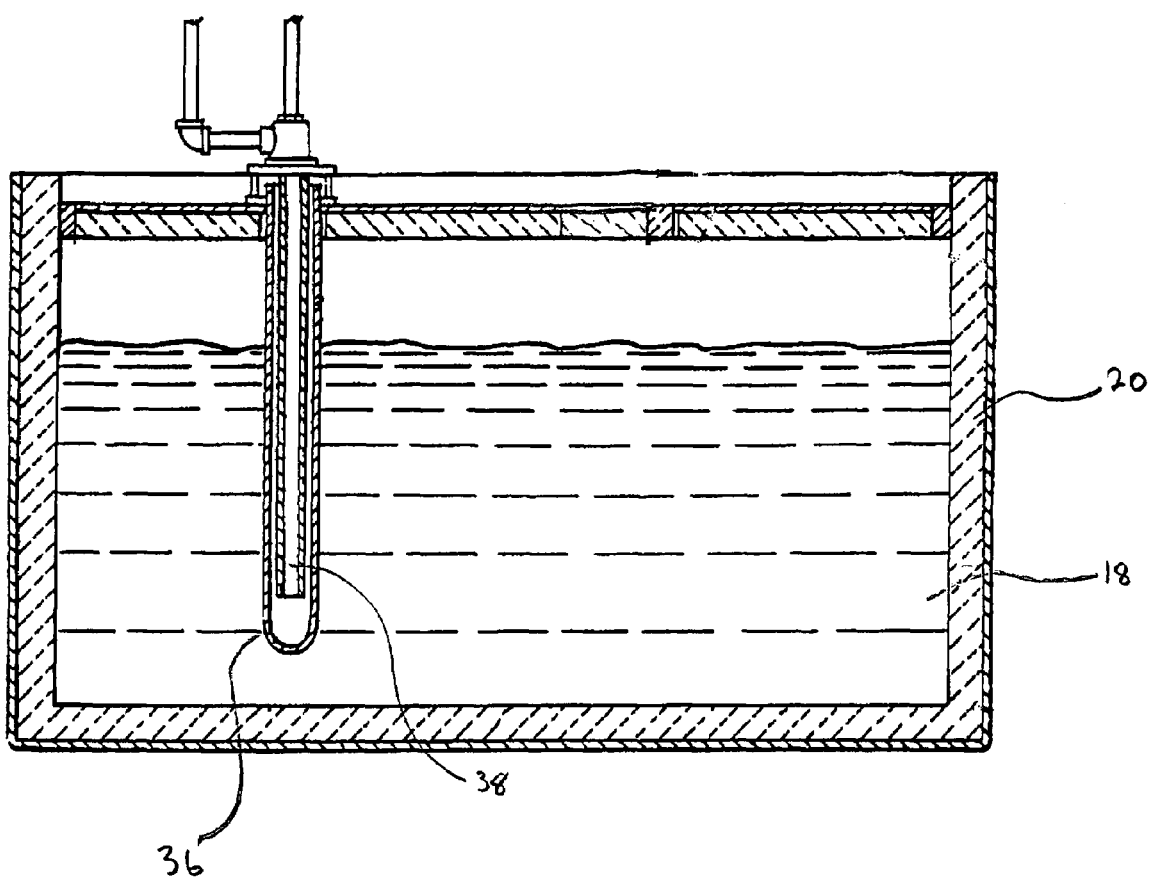
FIG. 5 is an elevational view of a molten metal bath illustrating a heater immersion tube made in accordance with the present invention.

One way to heat a molten metal bath 18 is to insert a heater immersion tube 36 into the vat 20 of molten metal 18, as illustrated in FIG. 5. The heater immersion tube 36 is a tube carrying one or more heating elements 38 and is immersed into molten metal baths to provide heat to the molten metal bath. Conventionally, the heater immersion tube 36 is made from fused silica or other ceramic. Ceramics are generally an insulator with poor heat transfer characteristics, so are inefficient in transferring the heat from the heating element 38 to the bath of molten metal 18. However, ceramic is used for the material of the heater immersion tube 36 because of its resistance to reactivity with the molten metal 18, especially aluminum, and its stability at high temperatures.

Fused silica tubes often undergo at least a devitrification or reaction with aluminum with exposure to the molten metal and then become embrittled and easily break after removal from the molten metal 18, as was discussed above in relation to riser tubes. After removal of a heater immersion tube 36 made from conventional materials from contact with the molten metal 18, the thermal and mechanical stresses from the change in temperature and any contact with any other material are often enough to break these tubes. For example, the devitrification changes may cause a volume change upon cooling when removed from the molten metal bath, resulting in rapid catastrophic structural failure of the tube.

Heater immersion tubes 36 made from the composite material of the present invention transfer the heat to the bath of molten metal 18 more effectively because of the improved thermal conductivity discussed above. Surprisingly, the molten aluminum in the bath of molten metal 18 does not react with heater immersion tubes 36 made from the composite material of the present invention, because these tubes 36 have already been fully reacted with aluminum. Thus, when tube 36 is removed from the molten metal 18, such as for maintenance, cleaning, replacement of the heating element, etc., the composition and structure of the heater immersion tube 36 is nearly identical to the composition of the tube 36 when it was originally inserted into the molten metal bath 18, and there is little likelihood of material failure due to mechanical or thermal stresses because of a change in the structure of the tube 36. This results in the ability to reinsert the same tube 36 into the molten metal bath 18.

Moreover, as discussed above, because the molten aluminum does not react with the heater immersion tube 36 made in accordance with the present invention, no impurities are introduced into the molten metal 18, and the structural integrity of the heater immersion tube 36 remains sound. Surprisingly, the aluminum in the composite material of the heater immersion tube 36 substantially remains in the composite material and does not move into the molten metal 18, although the molten metal 18 is at a temperature greater than the melting point of the aluminum in the composite material.

Because of the improved thermal conductivity of the heater immersion tube 36 material, energy is transferred more efficiently from the heating element 38 to the bath of molten metal 18 at a desired temperature. This results in cost savings and extended life to the heating element 38.

Figure 6:
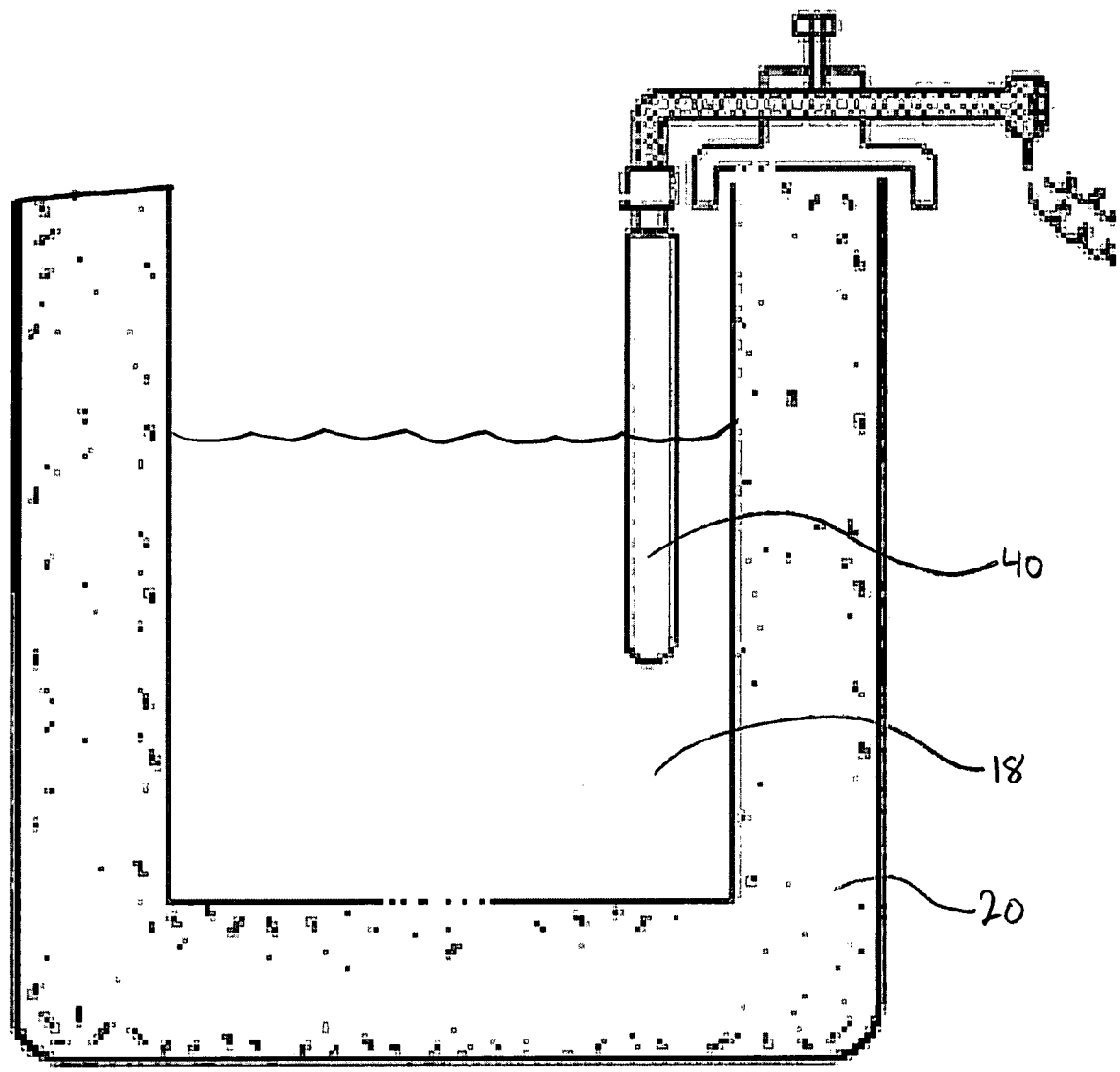
FIG. 6 is an elevational view of a molten metal bath having a thermocouple protection tube made in accordance with the present invention.

It is often necessary to submerge a thermocouple into the molten metal 18 to monitor the temperature of the molten metal 18. Because molten aluminum reacts with almost every material, submersion of the thermocouple may result in reaction, dissolution, corrosion, erosion, etc., of the thermocouple material. Therefore, often the thermocouple is placed within a thermocouple protection tube 40, which is then submerged into the bath of molten metal 18 to determine the temperature, as illustrated in FIG. 6. As discussed with the heater immersion tube 36, above, the thermocouple protection tube is conventionally made of fused silica or other ceramic, which often reacts either structurally or chemically with the molten aluminum to result in embrittled and changed structure and composition of the thermocouple protection tube 40. Removal of the thermocouple protection tube 40 from the bath of molten metal 18 may then expose the tube 40 to thermal or mechanical shock, causing breakage of the tube 40. A thermocouple protection tube 40 made from the composite material of the present invention has the above benefits relating to the composition and structure of the material, and is thus more structurally sound than thermocouple protection tubes 40 made from conventional materials.

Thermocouple protection tubes 40 made from the composite material of the present invention also have better thermal conductivity, which results in a more accurate reading of the temperature of the bath of molten metal 18 and less lag time in the transmission of an actual temperature change. This is a surprising improvement over the use of conventional materials for the thermocouple protection tube 40 in addition to the unexpected result of improved mechanical and thermal stability upon removal of the thermocouple protection tube 40 from the bath of molten metal 18.

Other articles made in accordance with the present invention suitable for contact with molten aluminum or other metal include ladles and stirring devices. In general, most articles made in accordance with the present invention exhibit improved integrity when exposed to molten metal, particularly molten aluminum.

The composite material of the present invention is surprisingly also well suited for armor plate or armor material (i.e., the hard component in a multi-material system) for absorbing and dissipating kinetic energy from high velocity projectiles. Ceramic armor is typically used for body armor and for the outer coverings of different types of vehicles, such as various types of land vehicles, ships, and aircraft. Typically, ceramic tiles are adhesively secured to a substrate then encapsulated in an outer cover. The armor system is then attached to a vehicle by a variety of means or merely placed in a fabric pocket, as in the case of body armor.

Figure 7:
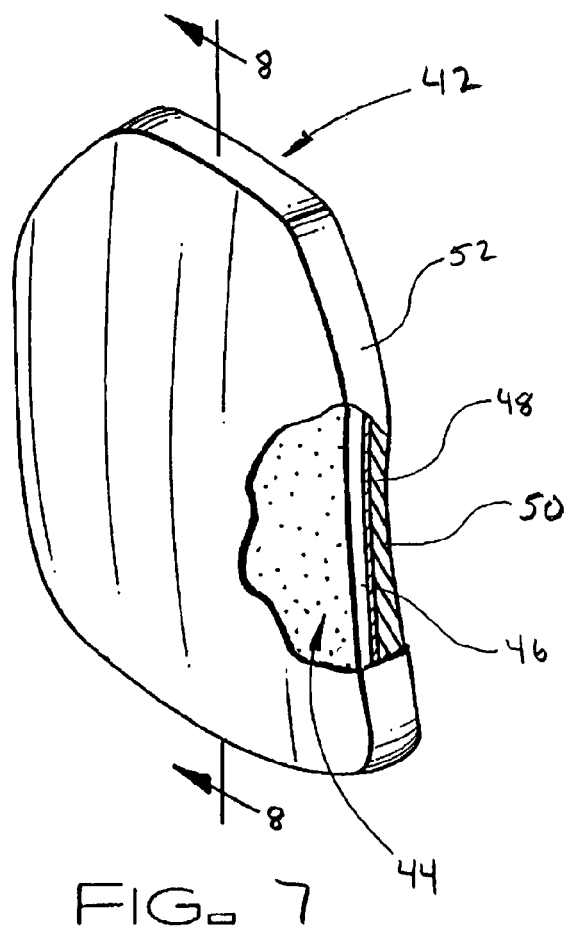
FIG. 7 is a perspective cut away view of armor made in accordance with the present invention.
Figure 8:
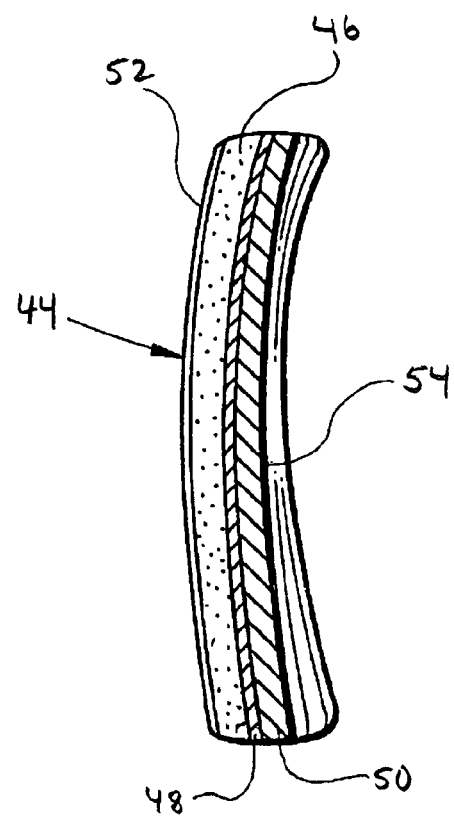
FIG. 8 is a cross-sectional view taken generally along the line 8-8 of FIG. 7.

As illustrated in FIGS. 7 and 8, armor 42 includes a cover 52 having an armor assembly 44 disposed therein. The cover 52 may have a rear portion 54 that partly or completely covers a rear surface of the armor assembly 44. The cover 52 may be constructed of a single material, such as nylon fabric, or may be a combination of fabric, rigid plastic, and foam, the choice of which will depend on circumstances, including cost and availability.

The armor assembly 44 includes a plate 46 of the ceramic/metal composite material of the present invention made as described above, a backing 50, and adhesive 48 therebetween. The backing 50 may be made from any suitable material, including Kevlar® or other aramid fiber, Spectra®, fiberglass cloth, natural or synthetic fibers, or any other suitable material, depending on, for example, cost and availability. The adhesive 48 may be any suitable adhesive, including, for example, epoxies, polyurethanes, polysulfides, polyolefins, urethanes, and mixtures or combinations thereof. The choice of adhesive will depend on the circumstances of the application.

The surprisingly improved thermal conductivity is also advantageous for other applications in which thermal control is desirable. This improved thermal conductivity is particularly well suited for thermal management devices, such as for semiconductor applications. This includes articles made in accordance with the present invention for use as heat spreaders, heat sinks, thermal diffusers, and substrates for semiconductors. Other applications include articles made in accordance with the present invention for thermal diffusers in cryogenics and aerospace applications.

Composite material of the present invention has improved electrical conductivity, as well as thermal conductivity, over conventional ceramic materials. Again, without intending to be limited to any particular theory, the continuity of the metal phase and the presence of the SiC in the composite may be responsible for the improved electrical conductivity over conventional ceramic materials. The improved electrical conductivity, much like the improved thermal conductivity, is the result of removing the inherent resistive silica layer from the SiC particulates. Removal is a consequence of the reaction with molten aluminum, converting the silica layer to a composite layer of both aluminum and alumina. Contact between the SiC and aluminum portion of the reacted surface layer provides superior pathways for both electrical and thermal conduction.

Improved electrical conductivity, coupled with the other properties of the composite materials of the present invention, provides for a number of potential uses and products, including but not limited to electric motor brushes, high temperature/hostile environment sensors and probes, electrodes (e.g., anodes or cathodes) and current collectors for use in fuel cells, electrochemical applications, aluminum smelting, molten metal processing, etc.

While the present invention has been illustrated by the above description of embodiments, and while the embodiments have been described in some detail, it is not the intention of the applicants to restrict or in any way limit the scope of the invention to such detail. Additional advantages and modifications will readily appear to those skilled in the art. Therefore, the invention in its broader aspects is not limited to the specific details, representative apparatus and methods, and illustrative examples shown and descried. Accordingly, departures may be made from such details without departing from the spirit or scope of the applicants' general or inventive concept.

We claim:

1. A composite material comprising at least about 50 volume percent boride or carbide, the composite material comprising a ceramic portion having alumina and an aluminum alloy made by:
   a. contacting a silica-bonded boride- or carbide-based preform with a molten aluminum alloy comprising between about 18 weight percent and about 95 weight percent silicon;
   b. allowing reaction between the aluminum and the silica in the preform to go substantially to completion; and
   c. removing the composite material from contact with the molten metal.

2. The composite material of claim 1, wherein the material is substantially non-reactive with aluminum.

3. The composite material of claim 1, wherein the ceramic portion comprises silicon carbide, boron carbide, or titanium diboride, or mixtures thereof.

4. The composite material of claim 3, wherein the ceramic portion comprises particulate silicon carbide having an average diameter of between about 5 micrometers and about 5000 micrometers.

5. The composite material of claim 1, comprising at least 50 volume percent carbide particles.

6. The composite material of claim 5, comprising at least 60 volume percent carbide particles.

7. The composite material of claim 1, comprising between about 50 and 90 volume percent carbide, between about 32 and 7 volume percent aluminum oxide, and between about 18 and 3 volume percent aluminum.

8. The composite material of claim 1, comprising an essentially continuous ceramic portion.

9. The composite material of claim 1, comprising less than about five weight percent silica.

10. The composite material of claim 9, comprising less than about one weight percent silica.

11. The composite material of claim 1, wherein the density of the preform is at least about 75 volume percent.

12. The composite material of claim 11, wherein the density of the preform is at least about 85 volume percent.

13. The composite material of claim 1, wherein the composite material is made from a preform that is sufficiently free of interstitial cavities to promote formation of composite material without travel of reactants through interstitial cavities.

14. The composite material of claim 1, wherein the composite material is made from a preform that is substantially totally immersed in molten aluminum alloy.

15. An article comprising the composite material of claim 1.

16. The article of claim 15, wherein the article is capable of contact with molten aluminum without significant reaction with the aluminum.

17. The article of claim 16, wherein the article is selected from the group consisting of riser tubes, dies/molds, heater immersion tubes, thermocouple protection tubes, ladles, and stirring devices.

18. The article of claim 15, wherein the article has one or more surfaces to be exposed to friction or wear.

19. The article of claim 18, wherein the article is selected from the group consisting of bearings, nozzles, bushings, valve components, liners, brake components, clutches, engine components, and turbine components.

20. The article of claim 15, wherein the article is an electrical conductor.

21. The article of claim 20, wherein the article is selected from the group consisting of electric motor brushes, high temperature/hostile environment sensors, high temperature/hostile environment probes, electrodes, and current collectors.

22. The article of claim 15, wherein the article is a thermal management device.

23. The article of claim 22, wherein the article is selected from the group consisting of heat spreaders, heat sinks, thermal diffusers, and substrates.

24. The article of claim 15, wherein the article absorbs and dissipates kinetic energy from high velocity projectiles.

25. The article of claim 15, wherein the article is in substantially the same shape and size as the preform.

26. The article of claim 15, wherein the article is selected from the group consisting of riser tubes, molds, heater immersion tubes, thermocouple protection tubes, bearings, nozzles, bushings, valve components, liners, electric motor brushes, high temperature/hostile environment sensors, high temperature/hostile environment probes, electrodes, current collectors, and armor.

27. A ceramic/metal composite material comprising a ceramic portion comprising silicon carbide and boron carbide, and an alumina-aluminum binding phase, wherein the composite material has been substantially fully reacted with aluminum, and wherein the ceramic portion is formed from a preform comprising about 50 volume percent silicon carbide, about 15 volume percent boron carbide, and about 35 volume percent silica.

* * * * *